(No Model.)  2 Sheets—Sheet 1.
A. K. EATON.
SECONDARY BATTERY.
No. 266,114.  Patented Oct. 17, 1882.
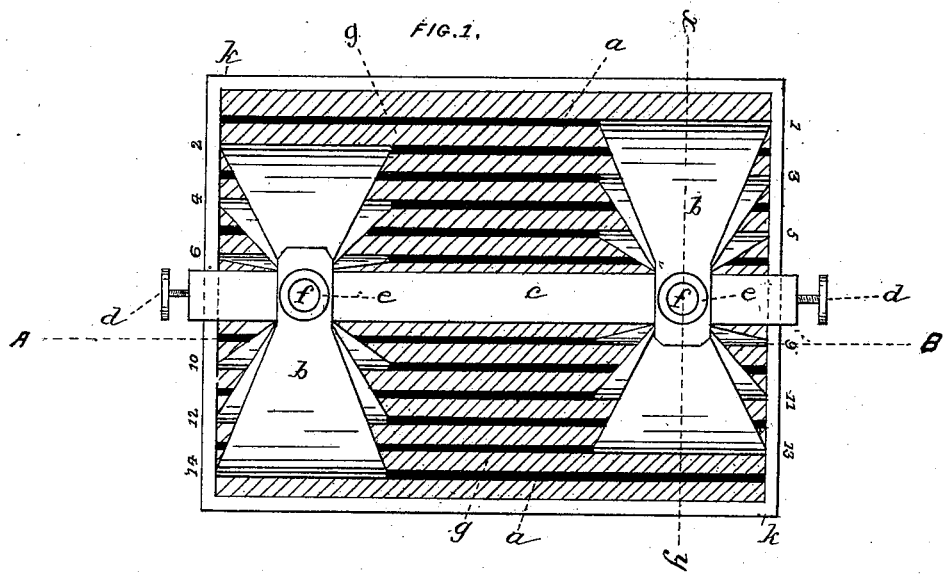
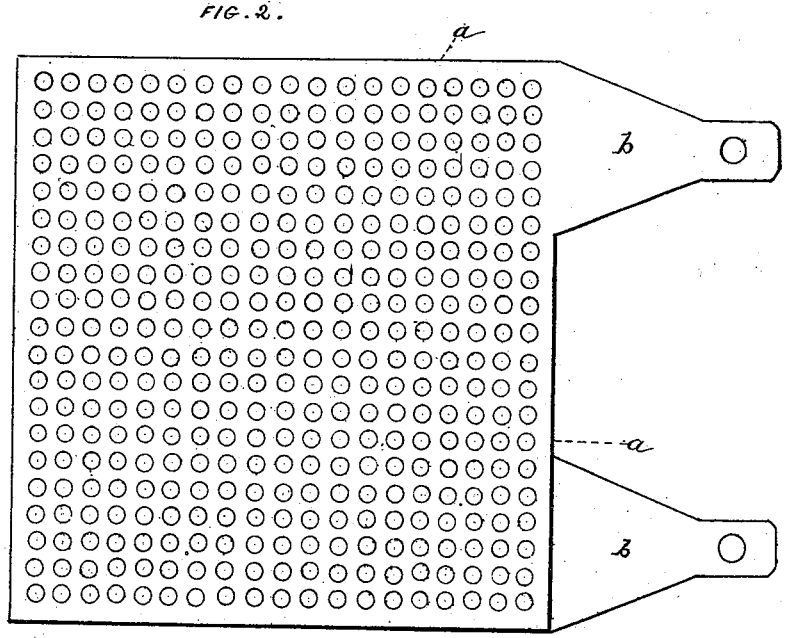
WITNESSES.  INVENTOR.

(No Model.)  2 Sheets—Sheet 2.

A. K. EATON.
SECONDARY BATTERY.

No. 266,114.  Patented Oct. 17, 1882.

WITNESSES.  INVENTOR.

UNITED STATES PATENT OFFICE.

ASABEL K. EATON, OF BROOKLYN, NEW YORK.

SECONDARY BATTERY.

SPECIFICATION forming part of Letters Patent No. 266,114, dated October 17, 1882.

Application filed March 1, 1882. (No model.)

*To all whom it may concern:*

Be it known that I, ASABEL K. EATON, of Brooklyn, in the county of Kings and State of New York, have invented a new and useful Improvement in Secondary or Storage Batteries for the Accumulation of Electricity, of which the following is a description in such full, clear, concise, and exact terms as to enable any one skilled in the art to which it belongs to make and use the same, reference being had to the accompanying drawings, making part of this specification, and to the letters and figures of reference marked thereon.

Figure 3:
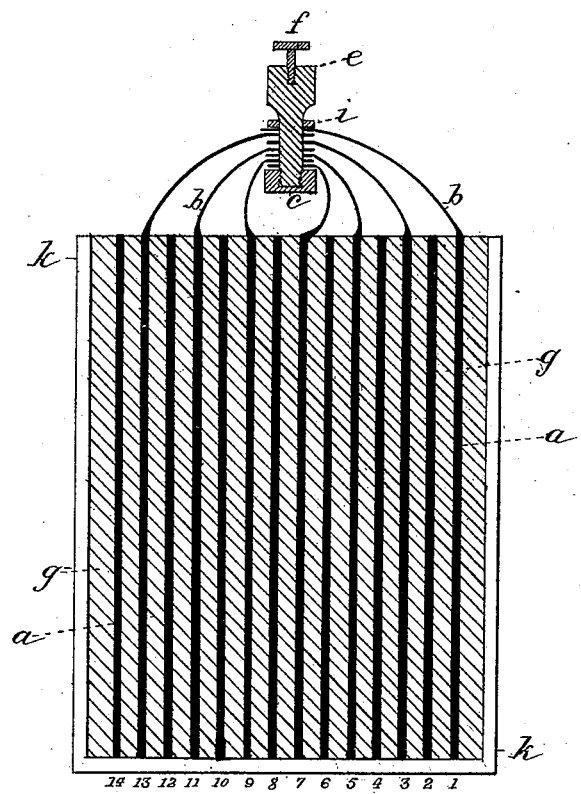
Figure 4:
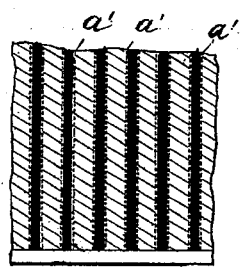

Figure 1 of said drawings is a top view of a storage-battery made upon the plan of my invention. Fig. 2 is a vertical section on the line A B; Fig. 3, a vertical section on the line x y. Fig. 4 is a section showing the sponge coating on each side of the metallic plate, as hereinafter described.

The object of my improvement is to obtain the greatest amount of surface in the storage-reservoirs with the least possible weight, and to give the greatest possible efficiency to the same.

In order to show the points of advantage resulting from my invention, I will briefly describe the principal storage-batteries heretofore in use.

Planté, who may, in a practical sense, be considered as the originator of the secondary battery, made use of two large sheets of plate-lead rolled together into a cylindrical form, with strips of rubber intervening to prevent contact of the two sheets, the roll being placed in a cylindrical vessel containing water acidulated with sulphuric acid, and the two sheets connected with the pole of a proper battery, one sheet being connected with the positive, the other with the negative, pole of the same. The action of the primary-battery current upon the lead plates of the secondary in the Planté battery is as follows: The water being decomposed, hydrogen is released from the lead sheet connected with the negative pole of the battery, and the oxygen developed at the surface of the sheet connected with the positive pole combines with the lead, forming a layer of peroxide of the metal. The battery is then disconnected and the accumulated electricity is discharged through a conductor connecting the different lead sheets. The battery is again connected, the poles having been reversed with reference to the two poles of the secondary—i. e., the sheet of lead connected with the positive pole in the first charge is connected with the negative in the second. In the second charging the hydrogen which is developed upon the surface of the previously-oxidized sheet combines with the oxygen of the peroxide of lead and reduces it to the form of a spongy coating of lead, and the opposite sheet becomes peroxidized. The secondary is again discharged and the poles of the battery again reversed. This change is repeated again and again until a sufficiently thick layer of lead sponge is formed on one sheet and a corresponding layer of oxidized sponge is formed on the opposite sheet, when it is ready for use. The time occupied in this (Planté's) process involved weeks or even months of time and very considerable expense, thereby making it practically of very little use.

Faure's improvement, which consists in coating the lead plates with red oxide of lead, enabled him to secure the desired surfaces of spongy lead on one plate and peroxide on the other by the first charge from the battery, and gave at once real value to the idea of storing or accumulating electricity by means of secondary batteries. The main objection to this form of battery lies in its weight, which makes it unwieldy. My invention aims at the production of the greatest amount of surface with the least weight of metal, and, in addition, a much greater facility in charging and discharging the accumulator.

The following is a description of my method of constructing and preparing a secondary or storage battery.

I form a skeleton plate, like Fig. 2, of very thin sheet-lead, that acts mainly as a conductor; or the skeleton may be an open wicker-work of lead wire for the same purpose. The skeleton is filled in and entirely embedded in very fine spongy crystalline lead by the following treatment: Two pieces of sheet-zinc are first prepared by coating each on one side with japan or any varnish that will protect the surface. One of these sheets is then placed, with the naked side of the zinc upward, in a shallow platter. The lead skeleton is then placed upon this. The other zinc sheet is placed, with its naked side downward, upon the lead skeleton. I then pour into the platter a sufficient quantity of a saturated solution of acetate of lead or its equivalent to cover the lead net-work. In a very short time the lead of the acetate is deposited on both sides of the lead skeleton, so as to entirely envelop it with lead sponge. The lead plates $a$ thus prepared, after washing, are pressed between two sheets of paper, parchmentized paper, cloth, asbestus-board, or other material, asbestus being preferred. These inclosing sheets of asbestus, with the included lead sponge, are then ready for use.

The plates may be made of considerable length and the two rolled together, after the manner of Faure, or, which is preferable, in smaller plates—say eight by nine inches—and then so packed in a box, $k$, Fig. 1, that the first, third, fifth, seventh, &c., plates, $a$, shall all be connected to form one pole, and the second, fourth, sixth, eighth, &c., plates joined to form the other pole.

It is not essential that a metallic skeleton be used for the preparation of these sponge plates. I sometimes have adopted the following substitute: I take any open or loosely-woven cotton cloth, bibulous paper, or asbestus-board as my skeleton and treat it exactly as I do the metallic skeleton. As the lead sponge is precipitated on both sides of the cloth or other substitute it strikes through the meshes or pores of the sheet and the two opposite layers knit themselves together, forming a continuous spongy metallic felting that is used in the same manner as the plates first described. In this case wires or strips of lead are embedded in the sponge to act as polar connections. By this arrangement it will be seen that a small amount of lead will expose an enormous amount of surface, and, farther, that the lead, in so far as one element of the accumulator is concerned, is already in complete condition for work, and the other, being in this finely-divided spongy form, is peroxidized with the greatest facility by the first action of the battery. In some cases I have covered one-half of the plates with a paste of peroxide of lead, in which case the accumulation needed no action of the battery for its first charge, but was ready for work immediately upon being put together. Batteries made in accordance to these directions receive the charge from the battery or dynamo-machine with very short exposure to its action, accumulate an unusually large amount of electric energy, and retain it for a long time without material loss. The amount of surface exposed by the sponge thus previously prepared is more than ten times that possible to be formed by the method now in use. I have been using storage-batteries of this construction for the last six months, and find them vastly superior to those made with solid sheet-lead. I have also applied the lead hair or fiber made under my patent dated March 9, 1880, in the preparation of my battery, upon the skeleton lead plates (which may be made of wire-cloth) and with good effect. I have also applied the same principle to the form of accumulator known as "Sutton's," in which one of the plates is of copper and the solution sulphate of copper, the other element of the accumulator being amalgamated sheet-lead. I precipitate in a similar manner spongy copper upon a skeleton plate, copper wire-cloth being most suitable for the purpose. The other element is of the same character as in the accumulator first described.

To facilitate the formation of the peroxide upon the plate connected to the positive pole, the surface of the lead-sponge plate may be painted with a paste composed of red lead mixed with acidulated water. In Figs. 1 and 3 of the drawings the sponge plate is shown by solid black lines; but really the sponge is on the surface of the plates, as shown by the dotted lines in Fig. 4.

I have discovered, also, that I can make a modified form of the sponge plate of a mixture of red lead and metallic sponge. This mixture soon hardens and becomes a strong porous solid, so that strong sponge plates can be made of it and form a very good substitute for the lead-sponge plate.

The construction of the battery as it appears in the drawings is very simple. The skeleton plate is shown by $a$. On the upper edge of each of these plates there is made a projection, $b$. These plates, having been treated as described, are set in the jar or box $k$ between sheets of asbestus-board $g$, the plates being arranged in pairs, and the projection $b$ of the respective plates of each pair is set in opposite ends of the box $k$. The projections are then bent over on a frame, $e$, and secured by binding-screws $f\,f$, one of which is connected with the negative and the other with the positive pole of the primary battery, the plates being of course properly insulated. The current is taken off from the binding-posts $d\,d$.

Having thus described my improvement in storage or secondary batteries, I claim and desire to secure by Letters Patent—

1. In the manufacture of storage-batteries, the treatment of skeleton plates in a solution of metallic salts for the purpose of obtaining a coating of sponge metal upon the skeleton by which the metallic sponge plates are formed previous to the organization of the battery, and of then combining said plates in a passive fluid to form the battery, substantially as described.

2. The method, substantially herein described, of preparing a storage-battery, which method consists of making a series of skeleton plates and of treating them with acetate of lead in the presence of zinc or its equivalent for the purpose of covering them with lead sponge, and of then combining them in an electrolytic solution and electrically connecting them to complete the battery, substantially as described.

3. In a storage-battery, the two electrodes, consisting of lead sponge upon skeleton plates, one electrode being combined with a coating of peroxide of lead in organizing the battery, by which it is made ready for use without the aid of a primary battery, substantially as described.

A. K. EATON.

Witnesses:
AMOS BROADNAX,
J. EDGAR BULL.